Feb. 15, 1927.

N. L. WOOD 1,617,888

WIND MOTOR

Filed Feb. 18, 1926     2 Sheets-Sheet 1

Inventor

N. L. Wood

By Lacey & Lacey, Attorneys

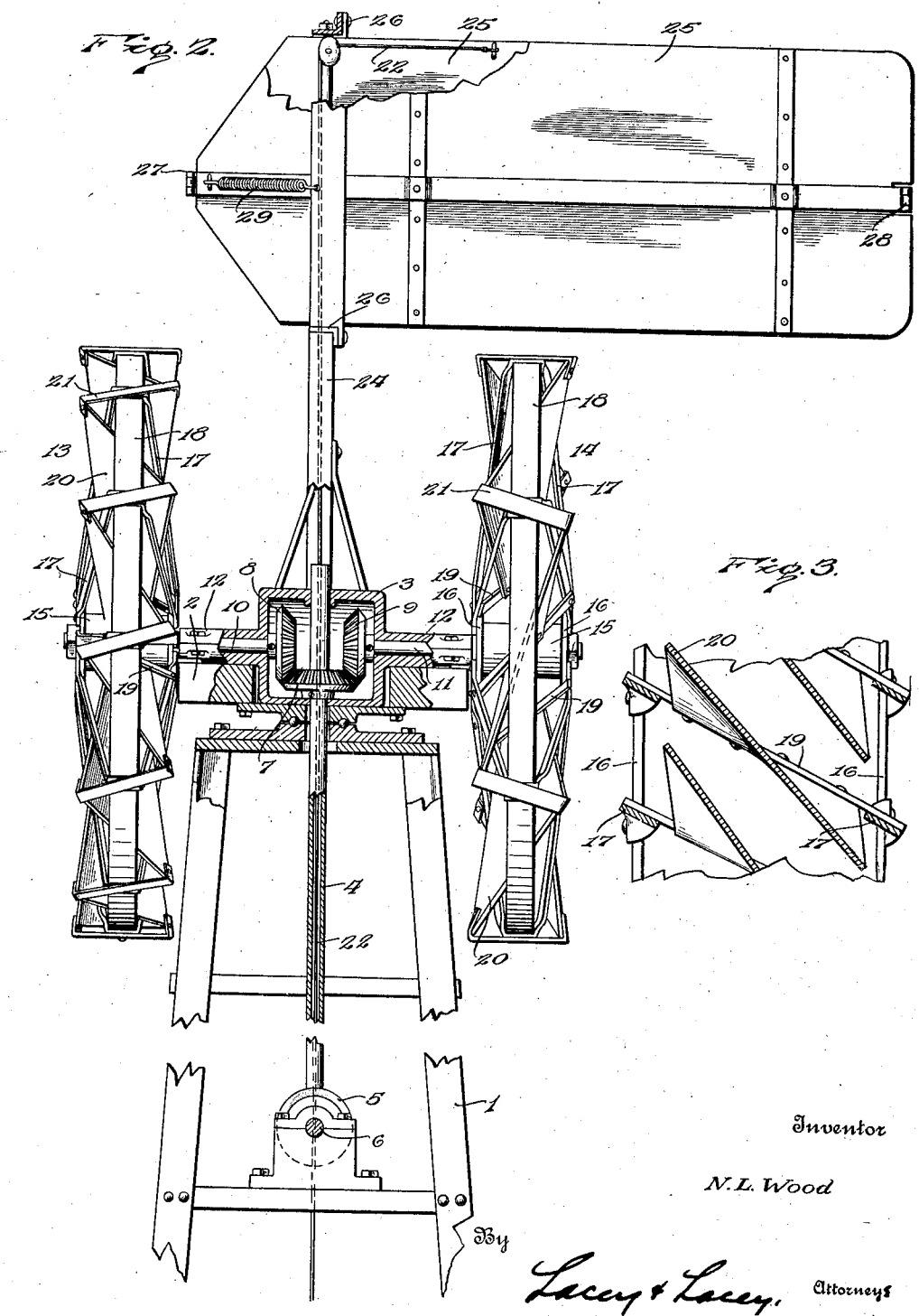

Patented Feb. 15, 1927.

1,617,888

UNITED STATES PATENT OFFICE.

NER L. WOOD, OF LAMAR, COLORADO.

WIND MOTOR.

Application filed February 18, 1926. Serial No. 89,220.

This invention relates to wind motors and has for its object the provision of a wind-propelled mechanism which will start more easily, run more steadily and develop more power from a breeze of given force than has been possible with wind wheels as heretofore constructed. A specific object of the invention is to provide a pair of wind wheels geared to a common driving shaft so that after the wind passes one wheel it will operate upon the other wheel and thereby be utilized twice to generate power instead of the single use possible with previous wind motors. The invention also has for its object the provision of wind wheels which will be very strong and durable and also the provision of vanes which will operate efficiently to hold the wheels to the wind. These objects and other objects which will incidentally appear in the course of the following description are attained in such a mechanism as is illustrated in the accompanying drawings, and the invention resides in certain novel features which will be particularly pointed out in the appended claims.

In the drawings:

Fig. 2 is a similar view taken at a right angle to the plane of observation in Fig. 1, and Fig. 3 is an enlarged detail section on the line 3—3 of Fig. 1.

Figure 1:
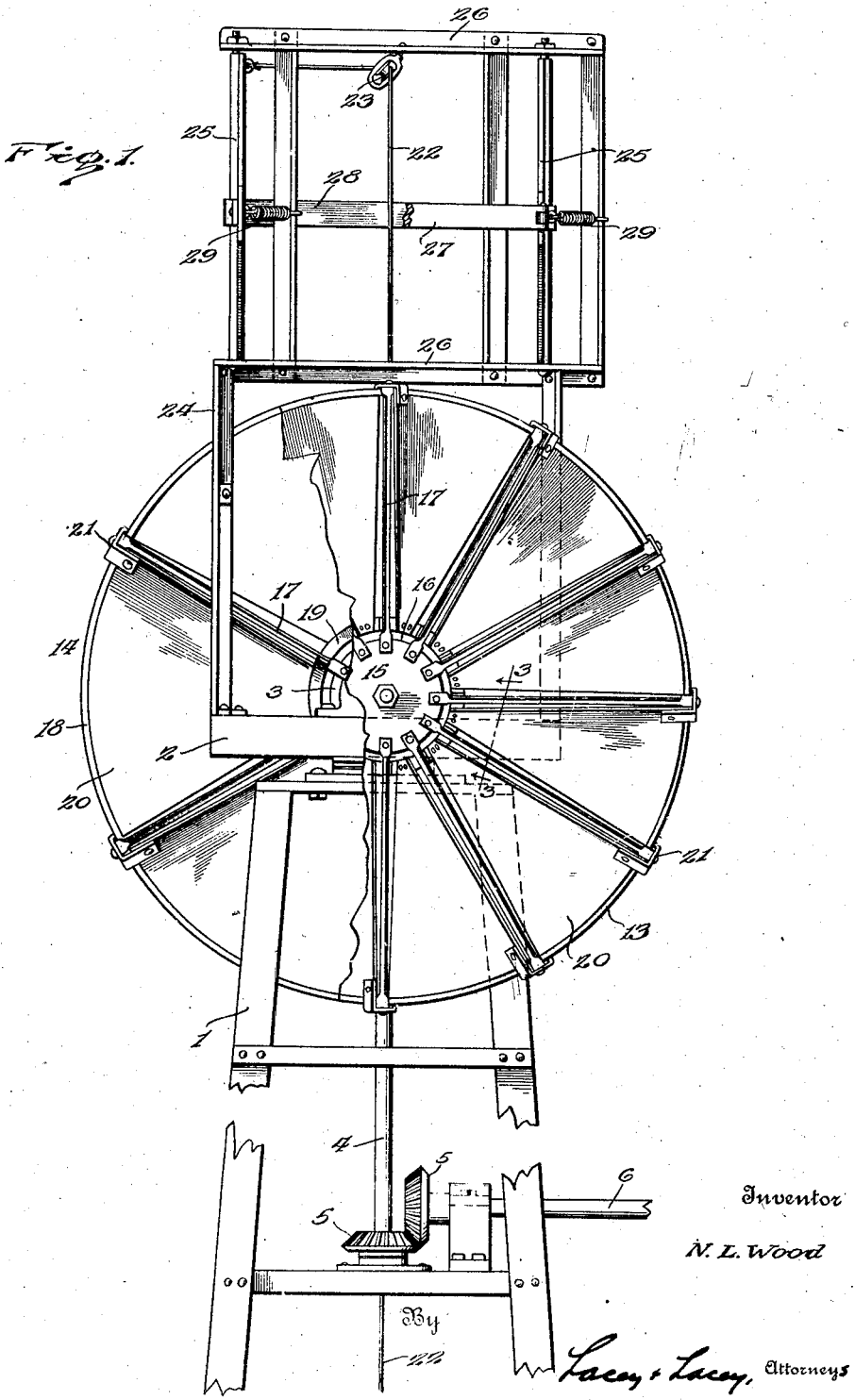
Figure 1 is an elevation, partly broken away, of a wind motor embodying my present improvements.

In carrying out my invention, I employ a tower or supporting frame 1 which may be of the usual or any approved construction and at the upper end of the tower is provided a turntable 2 adapted to rotate in a horizontal plane concentric with the vertical axis of the tower, as will be understood upon reference to Fig. 2. This turntable 2 supports a gear case 3 which receives the upper end of a hollow vertical driving shaft 4 supported in suitable bearings upon the tower and having its lower end connected by beveled gearing 5 with a transmission shaft 6 whereby the power may be transmitted to any machinery to be driven. Within the gear case 3, a beveled gear 7 is secured on the upper end of the driving shaft 4 and this gear meshes with opposed beveled gears 8 and 9 which are disposed within the gear case 3 and are secured upon the inner ends of axially alined shafts 10 and 11 journaled in suitable bearings 12 secured upon the turntable 2, as will be readily understood upon reference to Fig. 2. Upon the outer ends of the shafts 10 and 11 are secured the main and secondary wind wheels 13 and 14 respectively so that, although these wind wheels may rotate in opposite directions, power will be simultaneously transmitted through the described gearing to the driving shaft 4 so that it will be rotated and motion imparted to the transmission shaft 6 easily and quickly so that the said shafts will run steadily and smoothly.

The wind wheels each consists of a hub member 15 which is keyed or otherwise secured to the shaft 10 or 11, as the case may be, and which is constructed with end flanges 16, spokes or braces 17 being secured to the said flanges to extend radially therefrom and be secured at their outer ends to rims 18 to support the said rims and impart the desired rigidity to the structure. As shown most clearly in Fig. 3, the several spokes or braces are set with their widths disposed obliquely relative to the flanges 16 and the rims 18 whereby they will present surfaces upon which the wind may act and by which it will be deflected so that the braces or spokes will aid in imparting motion to the wheels under the influence of the wind. The braces or spokes are, of course, disposed in pairs and the inner ends of the spokes of each pair are connected by cross braces or connecting bars 19, spreading of the inner ends of the spokes being thereby avoided and additional strength being imparted to the wheels. The inner ends of the blades or vanes 20 are secured to the said cross braces 19 while the outer ends of the vanes or blades are secured between their side edges to the rims 18, outer cross bars or braces 21 being secured across the rim and connected at their opposite ends to the upper outer corners of successive vanes, as shown clearly in Fig. 2, so that a very rigid wheel is produced. It will be noted also that the wheel 13 has smaller but more vanes than the wheel 14 and in the operation of the machine it is intended that the wheel 13 be presented to the wind so that the full force of the wind will exert an impact upon the said wheel to impart rotation thereto. The wind will, of course, pass through the spaces between successive vanes of the wheel 13 and will then flow to and against the vanes of the wheel 14 so that a secondary propelling impulse will be imparted to the mechanism.

As previously stated, the driving shaft 4 is hollow. It will be noted upon reference to Fig. 2 that the upper end of the shaft extends through the top of the gear case 3 and that the controlling rope or cable 22 extends downwardly through the said shaft so that it may be manipulated from the ground. The upper end of the cable 22 passes over a guide pulley 23 at the upper end of a frame 24 within which the rudder vanes 25 are mounted, the upper end of the cable being secured to one of the vanes, as clearly shown. The frame 24 is erected upon the turntable 2 at the sides of the gear case 3 so that it is disposed between the wind wheels 13 and 14. The frame extends above the wheels, as clearly shown in the drawings, and a pair of vanes 25 is provided and pivotally mounted in the upper and lower cross bars 26 of the said supplemental frame 24. The ends of the rudder vanes 25 extend respectively in front and in rear of the frame 24, and braces 27 and 28 are hingedly or pivotally attached to the front and rear ends respectively of the rudder vanes so as to connect the said vanes for simultaneous and equal movement. Contractile springs 29 are attached to the front ends of the respective rudder vanes and to adjacent posts or rigid members of the supplemental frame 24 so that the vanes are normally held at a right angle to the said frame, and the cable 22 is attached to one of the vanes in rear of the pivotal support thereof so that a pull upon the cable will actuate the vanes in opposition to the said springs. The frame 24 carrying the rudder vanes is rigidly secured to the turntable 2 so that any rotary movement of the said frame will rotate the turntable about its center or point of support upon the tower 1, and if the wind should come from a direction at an angle to the rudder vanes it will impinge against the sides thereof and swing them around so that the main wheel 13, which is at the front ends of the rudder vanes, will be presented to the wind. If it be desired to prevent operation of the wind wheels, the cable 22 is drawn downwardly so that the rudder vanes will be turned into the wind and the cable then secured so that the vanes will be held to the wind and cannot turn the wind wheels thereinto. Of course, if the cable be loosened, the wind wheels will at once be swung into the operative position.

From the foregoing description, taken in connection with the accompanying drawings, it will be seen that I have provided a machine of few parts which are compactly arranged and are not apt to get out of order. By providing two wind wheels at opposite sides of the central vertical driving shaft and gearing both wheels to the said shaft, the wheels will act to some extent as self-governors so that the machine will run steadily and a lighter breeze may be advantageously utilized than has heretofore been possible. The peculiar construction of the wheels imparts great rigidity and strength to them so that they are not apt to be damaged by high winds and repairs will seldom be needed.

Having thus described the invention, I claim:

1. A wind motor comprising a supporting structure, a turntable mounted on the supporting structure, wind wheels carried by the turntable, means whereby the rotation of the wind wheels will be transmitted to a point of use, a frame secured rigidly upon and rising from the turntable, a pair of vanes pivotally mounted in the said frame above the wind wheels, connections between the said vanes whereby to cause simultaneous operation of the same in the same direction, yieldable means for holding the vanes at a right angle to the wheels, and means operable from the ground for securing the vanes against movement.

2. A wind motor comprising a supporting structure, a turntable mounted on the supporting structure, a wind wheel mounted on the turntable, a hollow vertical shaft disposed centrally in the supporting structure and the turntable and having its upper end operatively connected with the wind wheel, a frame fixed to the turntable and rising therefrom to a point above the wheel, a rudder vane hingedly mounted in the upper end of said frame and disposed above the wind wheel and normally at a right angle thereto, and a cable attached to the side of the vane and extending therefrom through the hollow shaft.

3. In a wind motor, a wind wheel comprising a hub, a rim, spokes connecting the hub with the rim and having their side faces disposed obliquely thereto, cross bars connecting the inner ends of corresponding spokes, cross bars secured to the rim and projecting to opposite sides of the same, and blades secured at their inner ends to the first-mentioned cross bars and at their outer corners to the second-mentioned cross bars.

In testimony whereof I affix my signature.

NER L. WOOD. [L. S.]